US012707288B2

(12) United States Patent
Hochdorf et al.

(10) Patent No.: US 12,707,288 B2
(45) Date of Patent: Aug. 11, 2026

(54) SYSTEM AND METHOD FOR DYNAMICALLY VARYING RETRY RATES IN UAV COMMUNICATIONS

(71) Applicant: Skydio, Inc., San Mateo, CA (US)

(72) Inventors: Eyal Hochdorf, Palo Alto, CA (US); Qian Liu, San Jose, CA (US); Tejaswy Hari, Milpitas, CA (US)

(73) Assignee: Skydio, Inc., San Mateo, CA (US)

( * ) Notice: Subject to any disclaimer, the term of this patent is extended or adjusted under 35 U.S.C. 154(b) by 430 days.

(21) Appl. No.: 18/124,479

(22) Filed: Mar. 21, 2023

(65) Prior Publication Data

US 2023/0300636 A1 Sep. 21, 2023

Related U.S. Application Data

(60) Provisional application No. 63/321,829, filed on Mar. 21, 2022.

(51) Int. Cl.

*H04W 24/02* (2009.01)
*H04B 7/185* (2006.01)
*H04L 1/00* (2006.01)
*H04L 1/1825* (2023.01)

(52) U.S. Cl.

CPC ........ *H04W 24/02* (2013.01); *H04B 7/18502* (2013.01); *H04L 1/0002* (2013.01); *H04L 1/0015* (2013.01); *H04L 1/004* (2013.01); *H04L 1/1825* (2013.01)

(58) Field of Classification Search

CPC .... H04W 24/02; H04B 7/18502; H04L 1/004; H04L 1/0002; H04L 1/0015; H04L 1/1825

USPC ................................ 370/316; 455/13.1, 13.2

See application file for complete search history.

(56) References Cited

U.S. PATENT DOCUMENTS

| | | | | |
|---|---|---|---|---|
| 7,007,089 | B2 * | 2/2006 | Freedman | H04L 45/38 709/225 |
| 2015/0131550 | A1 * | 5/2015 | Guo | H04W 72/04 370/329 |
| 2018/0013516 | A1 * | 1/2018 | Zoellner | H04H 20/423 |
| 2019/0174149 | A1 * | 6/2019 | Zhang | H04N 21/4728 |
| 2020/0288296 | A1 * | 9/2020 | Fiorese | H04W 64/006 |
| 2021/0306820 | A1 * | 9/2021 | Parikh | H04W 4/38 |
| 2022/0212700 | A1 * | 7/2022 | Siriwongpairat | H04W 52/367 |

* cited by examiner

*Primary Examiner* — Kwang B Yao
*Assistant Examiner* — Bradley D Lytle, Jr.

(57) ABSTRACT

Methods and apparatuses for enhancing vehicle range in a unmanned aircraft system is disclosed herein. An implementation of the method includes establishing a wireless communication channel between an unmanned aircraft and an end point and transmitting data from the unmanned aircraft to the end point over the wireless communication channel. This transmission is done in accordance with a transmission configuration, which defines a Forward Error Correction (FEC) value and a retry rate. The method further includes receiving transmission statistics related to transmitting the data and modifying the transmission configuration at least in part in response to the transmission statistics. The method also includes transmitting further data from the unmanned aircraft to the end point over the wireless communication channel in accordance with the modified transmission configuration.

20 Claims, 7 Drawing Sheets

SYSTEM AND METHOD FOR DYNAMICALLY VARYING RETRY RATES IN UAV COMMUNICATIONS

CROSS-REFERENCE TO RELATED APPLICATION

The present application claims priority to U.S. Provisional Patent Application No. 63/321,829 entitled "TECHNIQUES FOR DYNAMICALLY VARYING RETRY RATES IN UAV COMMUNICATIONS" filed on Mar. 21, 2022. The prior application is hereby incorporated herein by reference in its entirety.

TECHNICAL FIELD

Various implementations of the present technology relate to unmanned aerial vehicles (UAVs) and, in particular, to enhanced UAV communication efficiency to increase useful range of such vehicles.

BACKGROUND

Unmanned aerial vehicles (UAVs) or drones are commonly used to capture video, images, or other data from a vantage point or location that might otherwise be difficult or cumbersome to reach. In many cases, these locations may require flying comparatively long distances to access. UAVs are used for various purposes, such as for recreation, scientific exploration, military operations, intelligence gathering, and commercial uses. As the UAVs are unmanned, in many cases they receive piloting information remotely. Similarly, the data collected by the UAVs (video, images, etc.) is often provided remotely. In many of these uses, UAVs rely on one or two-way wireless communications, both to provide information to the UAV and/or to provide data from the UAV. Often this information must be supplied in real time.

This real-time wireless communication can become a limiting factor to the distance that a UAV can fly from a remote communication point, such as a ground control unit. For these reasons, it becomes desirable to improve the efficiency of communications to increase range of the UAV. Systems and methods are discussed herein that increase the efficiency of UAV communications.

OVERVIEW

A method and apparatus for enhancing vehicle range in a unmanned aircraft system is disclosed herein. The method includes establishing a wireless communication channel between an unmanned aircraft and an end point and transmitting data from the unmanned aircraft to the end point over the wireless communication channel. This transmission is done in accordance with a transmission configuration, which defines a Forward Error Correction (FEC) value and a retry rate. The method further includes receiving transmission statistics related to transmitting the data and modifying the transmission configuration at least in part in response to the transmission statistics. The method also includes transmitting further data from the unmanned aircraft to the end point over the wireless communication channel in accordance with the modified transmission configuration.

A UAV is also disclosed, which includes a processor and tangible memory. The tangible memory contains instructions, which, when executed by the processor, instruct the processor to perform a process. The process includes transmitting video data and receiving transmission statistics related to the transmission of the video data from a recipient of the video data. The process also includes analyzing the transmission statistics to determine an enhancement step and transmitting further video data utilizing the enhancement step.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
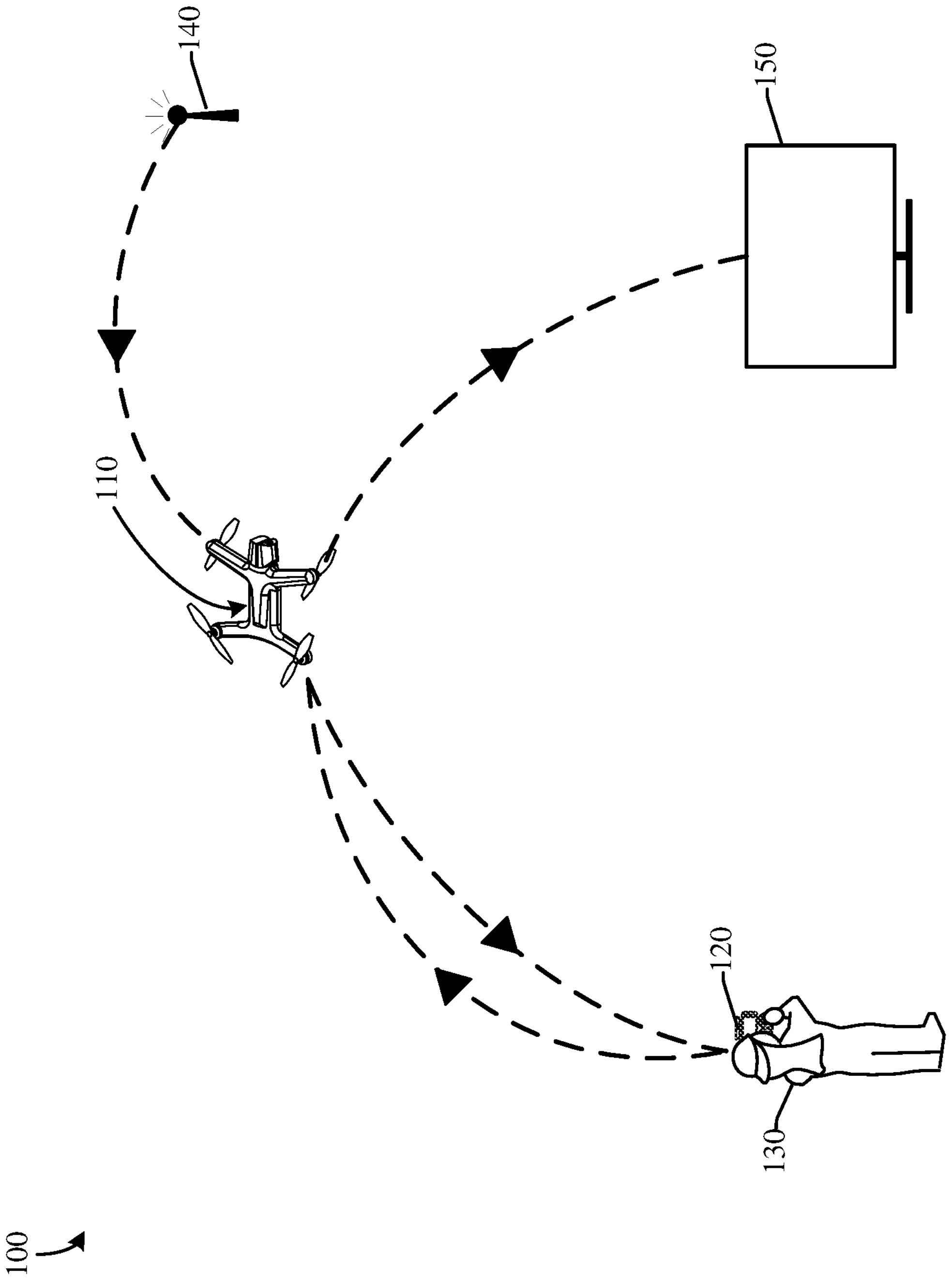
FIG. 1 illustrates an operational environment in an example implementation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Technology described herein is directed to techniques for optimizing retry rates in UAV communications and, more specifically, dynamically varying retry rates in UAV communications based on forward error correction coding (FEC). Additionally, optimization techniques are described for centralized retry/FEC applied throughout the system.

The standard operation of a small Unmanned Aerial System (sUAS) involves communicating over a wireless link with an end point. According to various implementations, this end point could be, for example, a ground control station, a remote controller, a video monitor, or a location beacon, among others. Some of these end points, such as ground control stations and remote controllers, typically send command and control information or location information to the UAV. This data, travelling to the UAV is referred to as uplink data. Some of the end points receive data back from the UAV, such as video data, photographic data, or other sensor output data as well as status information. Data travelling away from the UAV is referred to as downlink information.

In some implementations, the communication link is not symmetric. For example, the uplink command and control information is a relatively small amount of data compared to video data. Regardless, in order for the sUAS to operate effectively, both uplink and downlink data must be carefully managed.

UAVs frequently operate in outdoor, far-range use cases. In these scenarios and others, the communication links with UAVs can suffer from several impediments. Wireless signal decays with range. For a given output power and radio receive sensitivity, the ability to correctly decode incoming packets is generally limited to a certain range of operation. Additionally, in some implementations, the sUAS communications occur outdoors in the ISM radio band, which can expose the communications to varying amounts of interference, such as from WLAN, Bluetooth, ZigBee and other emitters in the ISM band. These emitters can interfere with the reception of the designated signal on both the uplink side and the downlink side.

Turning now to the drawings, FIG. 1 shows an operational environment 100 of a UAV in communication with several exemplary end points, according to an implementation. As discussed above, operational environment 100 is often outdoors. According to some implementations, operational environment 100 can also be indoors or in an enclosed space. UAV 110 is representative of an unmanned aerial vehicle in flight which is in communication with one or more end points. FIG. 1 also shows remote control 120 which is controlled by operator 130. Remote control 120 is a remote device capable of two-way communication with UAV 110, as shown by the bi-directional dotted lines. In an implementation, remote control 120 is a handheld device capable of providing command and control information to UAV 110 and receiving and displaying sensor data, such as live stream video feed from UAV 110. While operator 130 is shown operating remote control 120, operator is not necessary. In an implementation, remote control 120 is capable of operating autonomously. Alternatively, operator 130 may actually be multiple operators, dividing the capabilities of remote control 120 between the operators.

Beacon 140 is representative of an end point which communicates through uplink to UAV 110. In an implementation, beacon 140 is a location beacon that broadcasts data to UAV 140. While the communication link between UAV 110 and beacon 140 is shown as only an uplink, this is meant to show that data is transferred only or primarily from beacon 140 to UAV 110. Even when data is transferred only or primarily to UAV, UAV may still send acknowledgments to beacon 140 according to an implementation. In another implementation, beacon 140 may broadcast publicly, not expecting any type of acknowledgement or response from UAV 110, and/or UAV 110 may not provide any type of response.

Display 150 is representative of an end point that receives data through downlink from UAV 110, but does not provide data back through uplink. By way of example, display 150 may be a monitor or television that receives and displays video feed from UAV 100. As with beacon 140 above, while display 150 is understood to receive data exclusively or primarily, display 150 may still send acknowledgement messages to UAV 110. Alternatively, display 150 may only receive data that is publicly broadcast by UAV 110, with no response provided and/or required.

Figure 2:
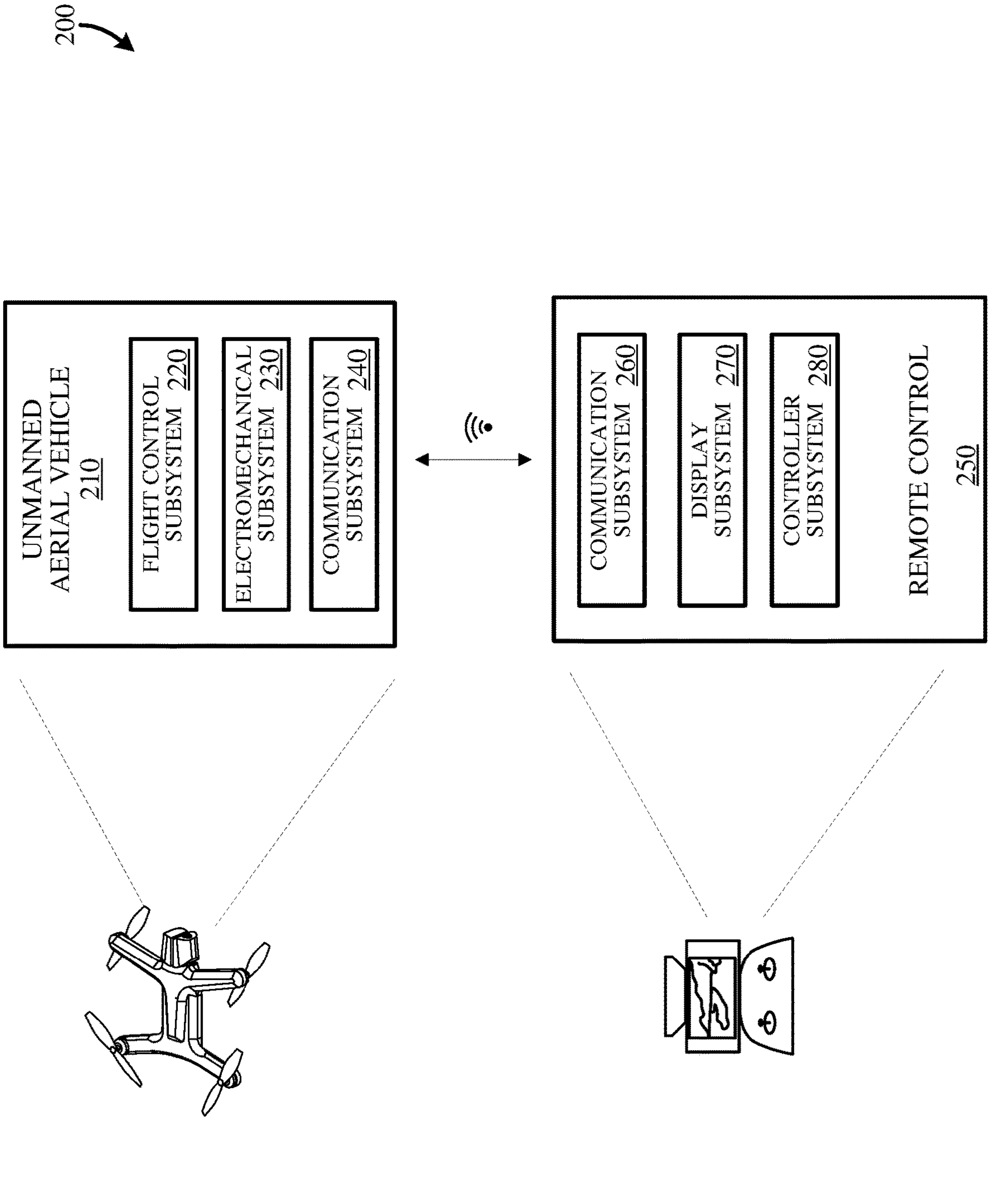
FIG. 2 illustrates a communication environment in an implementation.

FIG. 2 illustrates a communication environment 200 for a UAV, such as UAV 110 of FIG. 1 with an endpoint, such as remote control 120, beacon 140 or display 150 of FIG. 1. UAV 210 is represented with a flight control subsystem 220, an electromechanical subsystem 230 and a communication subsystem 240. In an implementation, flight control subsystem 220, an electromechanical subsystem 230 and a communication subsystem 240 are communicatively coupled, such that flight control system 220 is capable of exchanging instructions and/or status data with communications subsystem 240, and exchanging control data and/or status data with electromechanical subsystem 230. Electromechanical subsystem 230 may also communicate directly with communication subsystem 240 to exchange sensor data, for example.

Electromechanical subsystem 230 can cover a wide variety of electromechanical elements of UAV 210. By way of example, UAV 210 may include a number of rotors, such as 2, 4 or 6. This number is not limiting, and any number of rotors may be utilized. Each of the rotors may be connected to one or more motors as part of the electromechanical subsystem. Additionally, electromechanical subsystem 230 may include a number of sensors, such as global positioning system (GPS) sensors, inertial measurement unit (IMU), cameras or other optical sensors, temperature sensors, barometric sensors, sonar sensors, radar sensors, LiDAR sensors, or others. In an implementation, electromechanical subsystem 230 also includes deployment motors or triggers, such as might be required to release a payload or activate a process.

Flight control system 220, according to various implementations, may cover a wide variety of systems. In an implementation, flight control subsystem 220 includes a tangible memory and processing unit. The tangible memory may contain instructions that instruct elements of electromechanical subsystem 230 to operate. In an implementation, flight control subsystem 220 includes processing instructions that allow UAV 210 to control physical positioning in 3 dimensions using the sensor inputs provided from electromechanical subsystem 230 together with any command and/or control information provided from communication subsystem 240. Alternatively, flight control subsystem 220 may incorporate artificial intelligence (AI) or some other processing to identify objects and alter flight paths in accordance.

Communication subsystem 240 includes a transmitter and/or receiver and enables UAV 210 to communicate with remote control 250. In an embodiment, communication subsystem 240 operates in the ISM band using WiFi signals. It should be understood that communication subsystem 240 may use any type of wireless communications scheme, and that concepts discussed herein can apply to any such scheme. The data communicated by communication subsystem 240 can be split into packets for delivery. In an embodiment, communication subsystem 240 also includes a processor and tangible memory with instructions. The instructions enable communication subsystem 240 to prepare packets for transmittal and track transmittal. Likewise, communication subsystem 240 can receive packets and acknowledge receipt. Communication subsystem 240, in an implementation, can further collect statistics related to the transmittal and/or receipt of packets.

Remote control 250 is a representation of any end point that may communicate with UAV 210. As discussed above with regard to FIG. 1, remote control may enable two-way communication. In an implementation, remote control 250 is a handheld device capable of providing command and control information to UAV 210 and receiving and displaying sensor data, such as live stream video feed from UAV 210. Accordingly, remote control 250 can include communication subsystem 260, display subsystem 270 and controller subsystem 280. In alternate implementations, remote control 250 may not include all of the elements shown in FIG. 2.

Communications subsystem 260 is configured to interact with communications subsystem 240 on UAV 210. Thus, in a n implementation, communications subsystem 260 operates using WiFi signals, and separates data into packets for delivery. Communications subsystem 260 communicates with display subsystem 270 and controller subsystem 280. For example, communications subsystem 260 delivers video signals to display subsystem 270 for display on remote control 250. Similarly, communications subsystem 260 receives command and control signals from controller subsystem 280 to deliver to UAV 210.

Display subsystem 270 is referred to as a display subsystem, and controls display of data from UAV 210. Display subsystem 270 may alternatively (or additionally), in an implementation handle delivery of sensor or other data received from UAV 210. For example, temperature data received from UAV 210 may be displayed on remote control 250, or may be transmitted on to a remote server. Display subsystem 270 can handle either of these scenarios.

Controller subsystem 280 represents the input from and end point to the actions of UAV 210. For example, controller subsystem 280 can include one or more joysticks, or similar guidance device that can be used to provide flight control data to UAV 210. Controller subsystem 280 may include direct physical input, and/or may include processed input, such as computer guidance based on sensor data provided by UAV 210.

While details of UAV 210 and remote controller 250 are provided in FIG. 2, it should be understood that the principles of this disclosure can be applied to a number of UAVs and end points, and should not be limited by this disclosure.

When communications subsystem 240 exchanges messages with communications subsystem 260, those communications suffer from wireless signal degradation over distance and interference from other sources, as discussed above. These challenges serve to limit the area within which UAV 210 can operate.

Figure 3A:
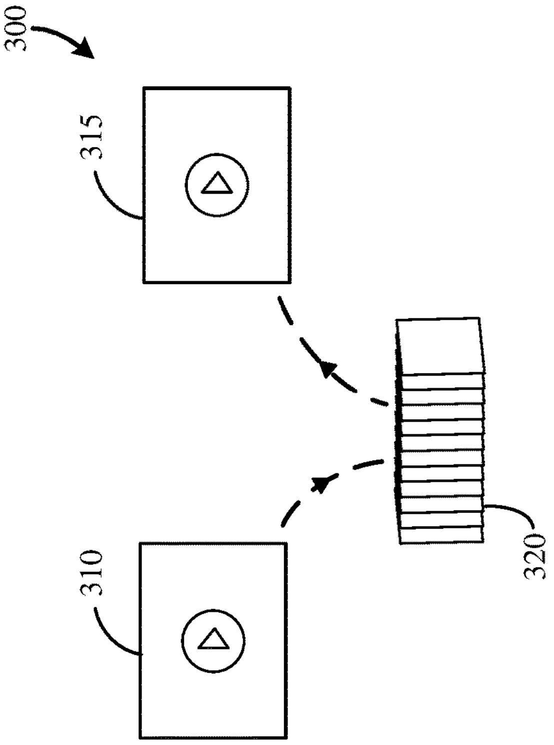
FIGS. 3A-3C illustrate example data transmission scenarios in an implementation.
Figure 3B:
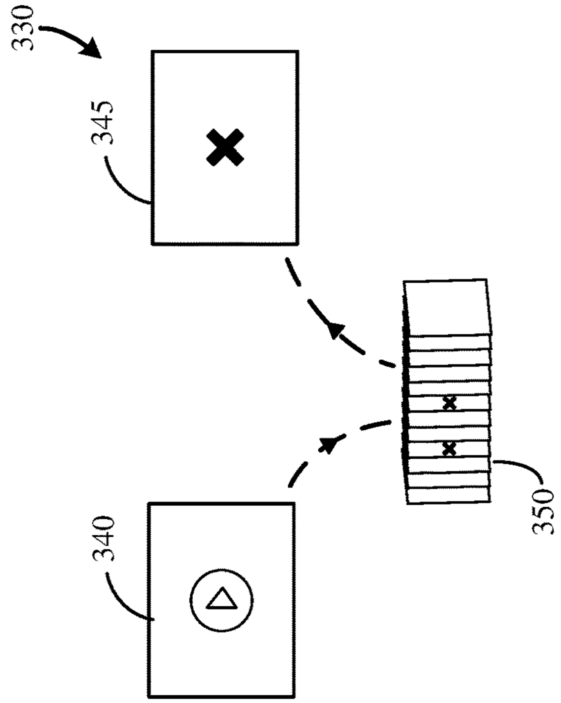
Figure 3C:
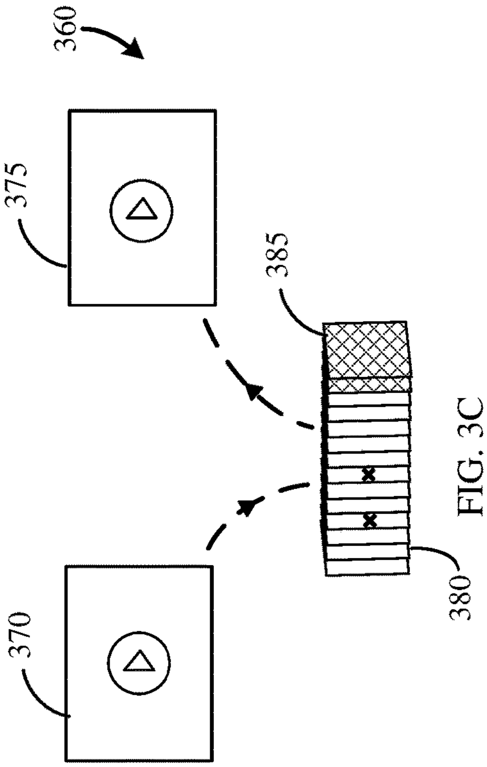

FIGS. 3A-3C illustrate the challenge faced in an implementation when packets are lost during communication. Example data transmission 300 in FIG. 3A shows input data 310, which is converted into packets 320, and converted back into output data 315. In FIG. 3A, input data 310 is shown as video data. This could be, for example, real-time video data that is sent from a UAV to a remote control. The input data 310 is converted into a number of data packets 320. By way of example, the real-time video is separated into multiple frames, and each frame is separated into multiple data packets 320. This could be a simple process where each frame is an image that is converted into multiple data packets 320, or a video encoding scheme may be used, in which each frame is encoded to reduce the file size, and the encoded frame is split into multiple data packets 320. In an implementation, these encoded frames may vary in size, and the number of data packets 320 may vary as well. In another implementation, the number of data packets 320 may remain constant for each video frame. When all of the data packets 320 are received, the video frame can be restored to a video frame. In an implementation, input data 310 is collected on UAV as a video frame, encoded and converted into multiple packets 320. These packets are transmitted from the UAV to the remote controller, and the remote controller combines the data packets 320, decodes the data, and displays the output data 315 as a video frame.

Turning to FIG. 3B, example transmission 330 shows a similar communication. As in example transmission 300, input data 340 (video frame) is encoded and divided into data packets 350 in UAV. These data packets are transmitted to a remote controller. In example transmission 330, two of the data packets 350 are shown with an "X" which represents that those packets are lost due to signal degradation or interference. In an implementation, because not all of the data packets 350 are received at the remote controller, the output data 345 is incomplete, and remote controller is unable to decode the output data into a video frame. Consequently, the video frame cannot be displayed. In an implementation, because the video encoding utilizes the video frames before and/or after the video frame represented by input data 340, multiple video frames may be lost and/or unable to be displayed at remote controller. Thus, particularly as the distance between the UAV and remote controller increases and/or interference increases, the transmission of input data 340 can be significantly limited.

In FIG. 3C, a solution is presented. In an implementation, as data packets 380 are received at the remote controller, the remote controller acknowledges the receipt of each packet. Thus, UAV recognizes that two of the data packets 380 have not been received at the remote controller, and resends those packets. These resent packets are shown as retry packets 385. After receiving the data packets 380 and retry packets 385, remote controller is able to combine the data packets 380 and retry packets 385 and decode the video into output data 375. The remote controller is then able to display the video frame.

It should be recognized that just as data packets 380 can fail transmission due to signal degradation or interference, acknowledgment messages can also be lost. Consequently, sometimes retry packets 385 will be sent even when a corresponding data packet 380 did not fail. While this does not affect the ability of the remote controller to receive the output data 375, it does increase the amount of data being sent from the UAV to the remote controller.

Figure 4A:
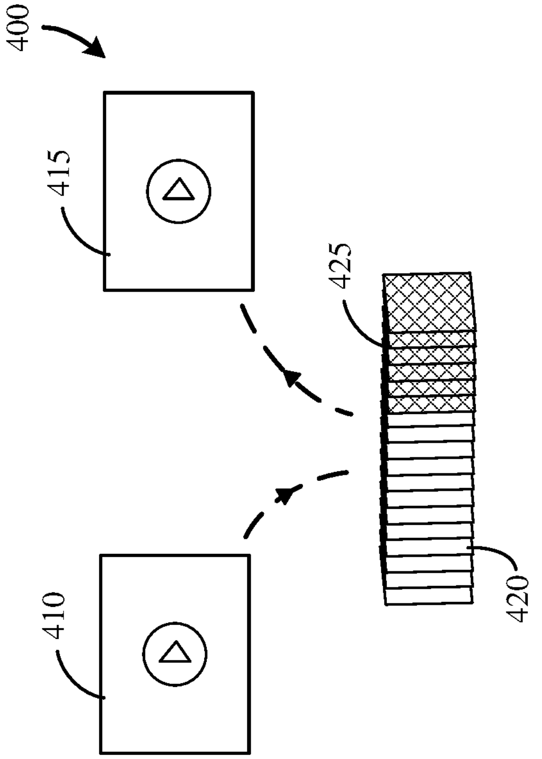
FIGS. 4A-4C illustrate example data transmission scenarios in an implementation.
Figure 4B:
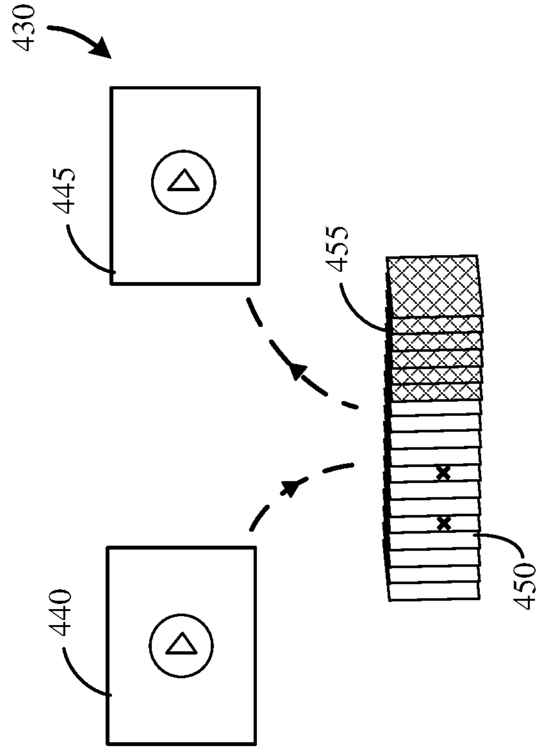
Figure 4C:
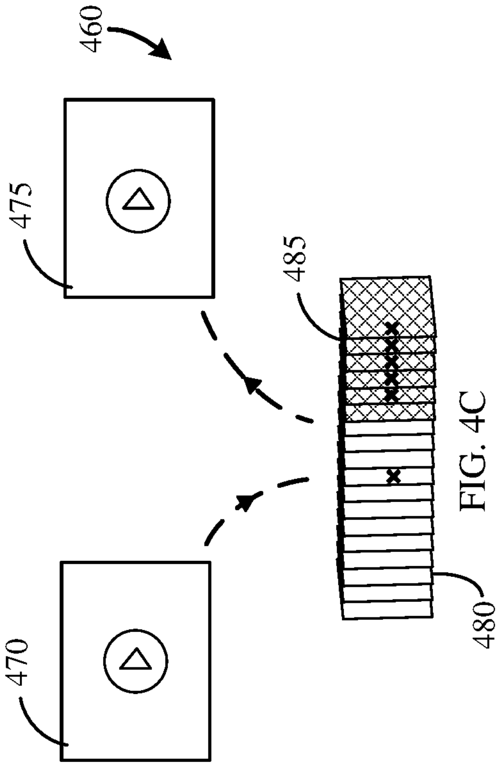

In FIGS. 4A-4C an alternate method of data protection is shown. In example transmission 400, input data 410 is represented as a video frame, and converted to data packets 420. In converting the input data 410 to data packets, FEC coding is used to incorporate redundant data. Redundant packets 425 are shown to represent the additional packets (over the number of packets dictated by input data 410) that are sent from the UAV to the remote controller. The FEC coding allows output data 415 to be extracted from data packets 420 and redundant packets 425, even if some of the packets are lost. In an implementation, as long as a number of packets is received which is over a threshold number, then the output data 415 can be decoded. For example, if input data 410 produces 100 packets, and 50 redundant packets, as long as 100 total packets (the threshold) are received, then the output data 415 can be successfully presented. One of ordinary skill in the art will recognize that the percentage of redundant packets sent, and the threshold can be adjusted or defined in accordance with the specifics of a situation.

In FIG. 4B, data packets 450 and redundant packets 455 are sent to remote controller. While some of the data packets 450 are lost, since a total number of packets received is over threshold number, the output data 445 can be displayed. Note that in an implementation, the particular packets that are lost does not matter, as long as a number of packets above a threshold is received.

In FIG. 4C, the input data 470 is converted in to data packets 480 and redundant packets 485, which are sent from UAV to remote controller. As described above with regard to FIG. 3C, remote controller sends an acknowledgment message to UAV for each packet received. Prior to receiving all of the data packets 480 and redundant packets 485, remote controller indicates that a number of packets above the threshold has been received. The remaining packets (shown in FIG. 4C as redundant packets 485 with an "X") can be ignored, or remote controller can indicate to UAV that no more packets need to be sent.

While FIGS. 3A-4C are all explained with regard to a video sent from a UAV to a remote controller, one of ordinary skill in the art will recognize that any type of data can substituted for the video data. Further, one of ordinary skill in the art will understand that any type of end point can be substituted for the remote controller, and that the communication can also be in the reverse (The end point sending packets to the UAV).

Retry packets and redundant packets both serve to counteract lost packets and improve communication between the UAV and remote controller. These two techniques can be contradictory in some situations, however. In an FEC situation, particular packets do not need to be received, as long as sufficient packets with redundant information are received. In a packet retry situation, when a particular packet is not received, that particular packet is resent. Thus, when both FEC coding and packet retry are functioning, bandwidth can be wasted. Signal transmission can be improved using a method for coordinating and dynamically varying FEC coding and retry rates.

Figure 5:
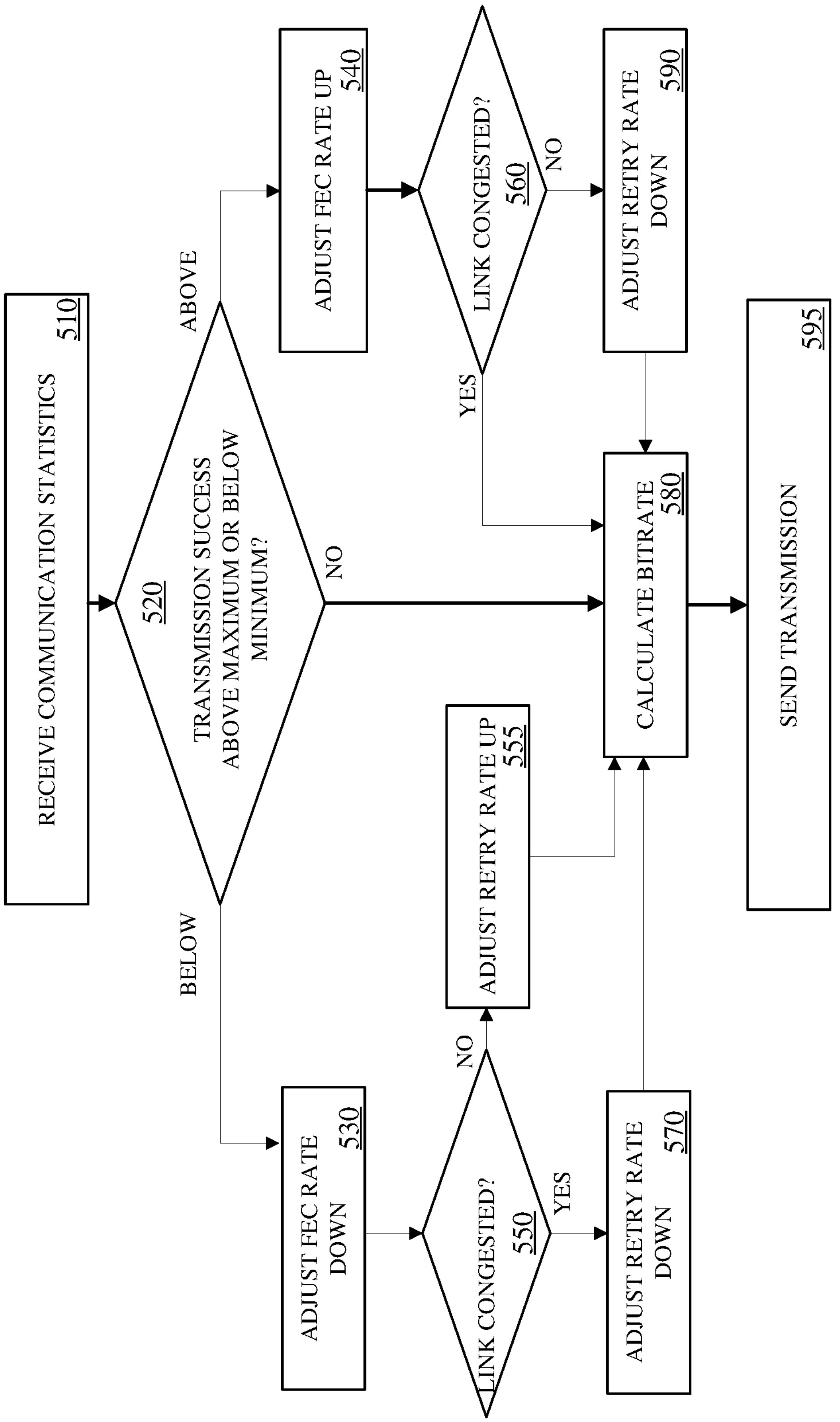
FIG. 5 illustrates an operating process in an implementation.

FIG. 5 illustrates an example method according to an implementation. The method represented in FIG. 5 can be operated between as an uplink or downlink of data between a UAV and an end point. Consequently, the steps of the method can be carried out in a processor located on the UAV or on the endpoint. In an implementation, a control node is located on the UAV, on the end point, or in a separate location, which facilitates and participates in the method. The control node may be physically or functionally separate from other systems within the UAV or end point, or may be combined with the UAV or end point. In order to discuss FIG. 5, an implementation will be presented, describing transferring data via a downlink from the UAV to a remote controller. The control node in this implementation is located on the UAV, and is indistinguishable from the remainder of the software and hardware on the UAV.

In step 510, communication statistics are received at the UAV. These communication statistics are collected by the communication subsystems on the UAV and the remote controller. In various implementations, these statistics may also be provided by another source, such as a monitoring node, a cloud server, or some other source. While the statistics received may vary based on the particular implementation, several example statistics are presented and described below.

Number of packets acknowledged. (Pkt Ack) This can represent the number of packets that were received reliably for a specific observation window. This could be, for example, tracked by the UAV as the number of packets for which an acknowledgement is sent or received. Similarly, this could be tracked as a percentage of transmitted packets that are acknowledged (tracked either by the UAV, the remote controller or another monitoring device). The observation window could refer to a window of time, or some other window, such as a geographical area or distance of a communication link.

Number of packets not successfully received or acknowledged. (Pkt Nack) This can include the number of packets that were not received reliably for a specific observation window and the number of packets that were not acknowledged. This could be tracked by the UAV or the remote controller or another monitoring entity. The threshold for determining whether a packet is reliably received could be dictated by the UAV, the remote controller, or the other monitoring entity, or the threshold characteristics could be determined in advance. This statistic could relate to the number of packets for which an acknowledgement is not received by the UAV. This statistic could also be tracked as a percentage of sent packets that were not reliably received.

Number of duplicate packets received. (Rcv Dup) This can include the number of packets that were received more than once within the observation window. For example, if the UAV does not receive acknowledgement messages from the remote controller, the UAV may resend a packet one or more times, and the remote controller may receive each of these packets. #Receive side duplicate packets—packets that were received more than once during the observation window.

Number of packets received. (Rcv Pkt) This can include the number of packets that were received reliably for a specific observation window. For example, this could be tracked by the remote controller and relate directly to the number of packets actually received by the remote controller. The remote controller could then transmit this statistic to the UAV.

Number of packets retried. (Rtry Pkt) This can relate to the number of packets that were sent multiple times. For example, the UAV may track how many packets were sent initially and then retried. In an implementation, packets that were retried multiple times may increase the statistic more. Alternatively, multiple retries may not affect the statistic differently than a single retry. This statistic can be tracked as a number or a percentage. For example, the UAV could divide the number of transmitted packets with the packets that were transmitted again.

Idle time. (Idle Time) This could represent the amount of time that the radio is not actively transmitting or receiving. This could be a combined statistic for the UAV and the remote controller, or may be collected and stored separately. This could be stored as a numerical time value or a percentage, for example.

While several statistics are described above, this list is not limiting, and one of ordinary skill in the art would understand that additional statistics might be collected and useful for the methods described herein.

In step 520, the transmission success is determined and compared to one or more thresholds. These thresholds can be set according to needs of a given implementation. For example, if video is being transmitted, then the loss of a single video frame can cause a break in the video stream, potentially of well more than one frame, due to dependency between the frames for encoding. In this case, the lower threshold for transmission success may be set at 100% of the required packets. An upper threshold can also be set, such that if a link is transmitting very successfully, the precautions can be lessened. For example, the upper threshold might occur if the link is routinely receiving 110% or 120% of the required packets. If the transmission success level falls between these thresholds, the transmission configuration can be left the same. It should be noted that this comparison does not require all three choices. In an implementation, for example, the method may not include an upper threshold, and the transmission configuration may always be adjusted, based on whether the success is above or below a single threshold.

In an implementation, a success ratio is defined as the probability to successfully send a packet through the wireless channel. This can be determined, for example, using the following equation:

$$Sr = \frac{Pkt\ Ack}{(Pkt\ Ack + Pkt\ Nack)}$$

The assumption here is based on acknowledgement. If this ack itself was not received the transmitter may think the packet was not received despite actual receipt. We define a correction value cPsr which relies on the probability that a packet would be received as $$cPsr = 1 - \left(Per \times \left(1 - \frac{Rcv\ Dup}{Rcv\ Dup + Rcv\ Pkt}\right)\right),$$

$$\text{where } Per = (1 - Sr).$$

In an implementation after determining that the transmission success falls below a threshold, the transmission configuration is created or adjusted. When a link is first created, there may not be an existing transmission configuration. After receiving statistics, the actual success of the link can be determined, and a transmission configuration can be created accordingly. Alternatively, in an active link, or in a newly created link that has a predetermined transmission configuration, the configuration can be adjusted to optimize the transmission success. This creation or alteration is represented as steps 530, 550 and 570 on the one side, and steps 540, 560 and 590 on the other side.

A challenging wireless link causes more retries and a lower probability of success ratio and modified success ratio. To combat this, an FEC user space mechanism is added that protects the packets that are not getting through. The FEC coding protects some of the packets that would otherwise fail to arrive at the receiver side. Decreasing the FEC coding rate can increase the probability of success, potentially by the same amount.

As we decrease the FEC coding rate the retry rate can often be reduced as the FEC coding already introduces redundant data.

In step 530, the FEC rate is adjusted downwards. As discussed with reference to FIGS. 4A-4C, FEC coding can create redundant data that is sent as an increased number of total packets. According to implementations, this redundancy could appear across the transmitted packets, such that an increased number of total packets are sent, with no particular packets necessarily containing exclusively redundant information. Alternatively, this could be extra packets that contain entirely redundant information, such that the original packets are all sent and a number of extra redundant packets are sent. The FEC coding can be adjusted, such that more or less redundant information can be sent. According to various implementations, the FEC coding could be set to add a set amount of redundant data, such as 0.25, 0.5, 0.75 or 0.9. Thus, if the FEC coding is set to send an additional 25% redundant data (set to 0.75), then the UAV will send 125% of the original data packets, not including any retry packets. In step 530, since the transmission success has fallen below the threshold, the transmission configuration adjusts the FEC coding downwards. For example, if the transmission configuration is currently set to send 25% redundant information, this number can be shifted up, such that the new transmission configuration is set to transmit 30% redundant information. In an embodiment the step sizes may be preset. For example, FEC coding step up may be set to a 5% decrease, a 6.25% decrease, a 7.5% decrease, or a 10% decrease. The step up may be preset to the same or a different level. In an implementation, the FEC step up preset may be half of the step down preset. If the FEC coding may have FEC thresholds above or below which the adjustment will not proceed. For example, if FEC coding is already set to 0.25, the FEC reduction may not reduce the FEC coding at this step.

While step 550 is shown after step 530, the order, particularly of steps 530, 550 and 570, as well as steps 540, 560 and 590 can be done in any order. In Step 550, the link congestion is checked. Because any communication between UAV and remote controller requires a transmitter and a receiver must both be capable of handling the amount of data being exchanged. With both FEC coding and retry attempts, the amount of data being exchanged increases with additions.

The link congestion determination is based on the idle time, packet success ratio (Psr) on the vehicle, and received packets (Rcv Pkt) on the vehicle. If the idle time is lower than a threshold, or the UAV Psr equals zero (or falls below a threshold), or the UAV receives zero packets (or this number falls below a threshold), the link is considered to be congested. In an implementation, the method identifies that the link is congested, and has already determined that the FEC rate should be decreased. Thus, the method determines that less data should be sent over a congested link. In order to accommodate this redundance increase in data due to the FEC, the limit on retry attempts is reduced in Step 570.

In step 570, the limit on retry rates is adjusted. In an implementation, this is adjusted down, reducing the number of repeat packets sent. As discussed above, retry packets are not always necessary when using FEC coding. Therefore, as the FEC coding is increased, particularly when the link is congested or nearing congestion, the limits on retry rates can be reduced. This reduction may be subject to out limits. For example, if the retry limit is already set to 10, the limit may not be further reduced. After the reduction, the process moves to step 580.

In step 550, in an implementation, the link is determined not to be congested, and the process moves to step 555, in which the limit on retry attempts is increased. Following this increase, the process moves to step 580.

In step 580, the bitrate to be transmitted is calculated. This calculation can be based, for example, on the success ratio, or modified success ration Psr, the FEC coding rate, the previous transmission bitrate, and/or idle time. In some cases, the bitrate calculation may use any of the transmission statistics mentioned above. As an example, if a link is found to be congested, the bitrate could be automatically reduced, such as by 20%. A bitrate reduction, which reduces transmission quality, could require smaller or fewer packets to be successfully transmitted through the link, thus potentially increasing successful transmission over the link.

Looking back to Step 520, in some cases, the transmission success level is adequate, such that is falls between the upper and lower thresholds. In this case, the process can proceed to step 580, discussed above. Alternatively, the process could skip step 580 and proceed directly to step 595, to be discussed below.

Alternatively, in step 520, the transmission success may be found to be above the upper threshold. While this indicates a successful transmission, it may also indicate that excessive bandwidth may be wasted on precautions that are not needed. In some cases, while the transmission success is very high, the link may be congested or nearly congested, or the bitrate may be set lower than necessary. Thus, when the transmission success is found to be above the upper threshold, the process moves to step 540. In step 540, the FEC coding is increased. As discussed above in step 530, limits may be set on FEC coding such that it may not be set above an FEC coding threshold, such as 0.9, or below an FEC coding threshold, such as 0.25. One of ordinary skill in the art would understand that alternate thresholds could be used, such as 0.3, 0.5, 0.7125, for example. As discussed above, the amount of decrease in the FEC coding may be set to a step level, which may not equal the decrease step level. For example, the FEC coding may be configured to step up by 0.125 each time the FEC coding is increased.

In step 560, the link is analyzed for congestion, and discussed above with regard to step 550.

In step 590, The retry rate is adjusted. In an implementation, this rate can be adjusted down, to somewhat counteract the increase in FEC coding. As with FEC coding, the retry rates may be set with upper and/or lower limits. For example, the minimum limit for retry rates may be set to 10, whereas the maximum limit for retries may be set to 31. If the limit is already set to 10 prior to step 590, the retry limit may not be further decreased. As with FEC rate, the retry rate limit may be adjusted up or down by a fixed step size, such as up by 2, down by 1.

In step 595, the transmission is sent according to the modified transmission configuration. In an implementation, this new transmission will create new communication statistics, and the process will begin again.

Figure 6:
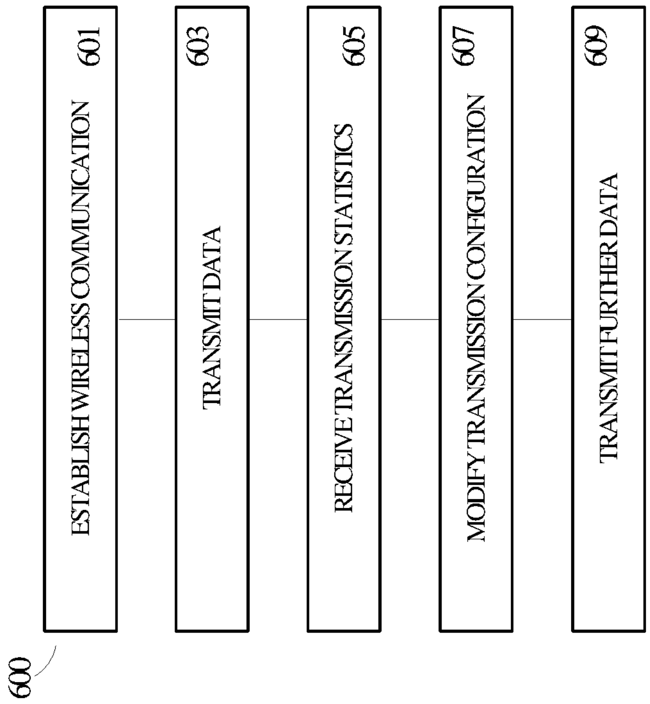
FIG. 6 illustrates example method in an implementation.

FIG. 6 illustrates an example method 600 of dynamically varying retry rates according to an implementation. In step 601, wireless communications are established. This wireless communication could be between any elements of the sUAS. For example, the wireless communications may be a communication link between a UAV and a remote controller. The wireless communication may be a one- or two-directional link. In an embodiment of a link between a UAV and a remote controller, for example, the wireless link may transmit command and control information from the remote controller to the UAV, and video data from the UAV to the remote controller. The wireless link may utilize any type of wireless communication signal. For example, the communication link between a UAV and a remote controller may use a WiFi signal in the ISM radio band.

In step 630, data is transmitted over the wireless communication link. For example, a UAV may send live video information to a remote controller. This live video may be split or encoded into individual frames, and each frame divided into packets. The packets are then sent individually over the wireless communication link to the remote controller. The remote controller may acknowledge each of the received packets to the UAV. In an implementation, not all of the packets are received. In a further implementation, not all of the acknowledgement messages are received.

The data transmitted in step 603 may be sent according to a transmission configuration. In an implementation, the initial transmission of data over a new communication link is sent without any FEC coding or retry rate limitation. In alternate implementations, the initial data is sent according to a preset initial transmission configuration. This initial configuration may, for example, set FEC coding to 0.25 and the retry rate limit at 10.

In step 605, transmission statistics are received. The transmission statistics relate to the data transmitted, such as the data transmitted in step 603. The transmission statistics may include, for example, a number of packets received, number of packets acknowledged, number of packets not received, number of packets not acknowledged, number of acknowledgements received, number of duplicate packets received, number of packets retried, idle time, percent of packet received, percent of packets acknowledged, FEC coding rate, maximum retry rate, transmission time, distance of transmission, bitrate, or others. The transmission statistics can be received at a control node. The transmission statistics may be received individually, and from various sources. For example, the control node may be located on the UAV, and the statistics related to the number of acknowledgements received, idle time, and FEC coding rate may be available directly from the UAV. Other statistics, such as number of packets received and number of duplicate packets received may be received from the remote controller. Still other statistics, such as distance of transmission may be available from a cloud-based server. In an alternate implementation, the transmission statistics may be collected into a report which is received by the control node. The control node, in an implementation, can be specially configured to receive transmission statistics and coordinate FEC coding and retry rates. In an implementation, the control node is located on the UAV, and is part of the memory and processing system of the UAV. In an alternate implementation, the control node is located on the remote control. In an implementation, the control node is located partially or completely on a cloud based server, and is configured to communicate with the UAV and/or remote controller to receive reports of communication statistics and provide reports of transmission configurations.

In step 607, a transmission configuration is modified. In an implementation, this modification may be an initial creation of a transmission configuration. For example, in an implementation where the initial communication was sent with not transmission configuration, the initial transmission configuration will be created based on the transmission statistics received. Alternatively, an existing transmission configuration is modified based on the transmission statistics received. The transmission configuration can control the FEC coding rate, the retry rate limits and the bitrate of the transmission, for example. The transmission statistics can be used to understand the type of error patterns that are being experienced. For example, if the error patterns present in short bursts, the error patterns could indicate that the transmission is experiencing interference from other signals. This could indicate that packet retry is less effective than increasing the FEC coding rate. Thus the modification step may choose to increase the FEC coding rate while reducing or leaving the maximum retry rate. Some error patterns, such as thermal error patterns do not indicate a clear preference for FEC coding or retry rates. In some cases, such as where duplicate packets received is high, may indicate that acknowledgements are not being received. In such cases, reducing the maximum retry rates could be beneficial. By using the combined transmission statistics and considering both FEC coding rates and retry rates, the modified transmission configuration can serve to improve overall success of the communication link.

In step 609, further data is transmitted according to the modified transmission configuration. This transmission can create further transmission statistics, which will be used to further improve the communications.

Figure 7:
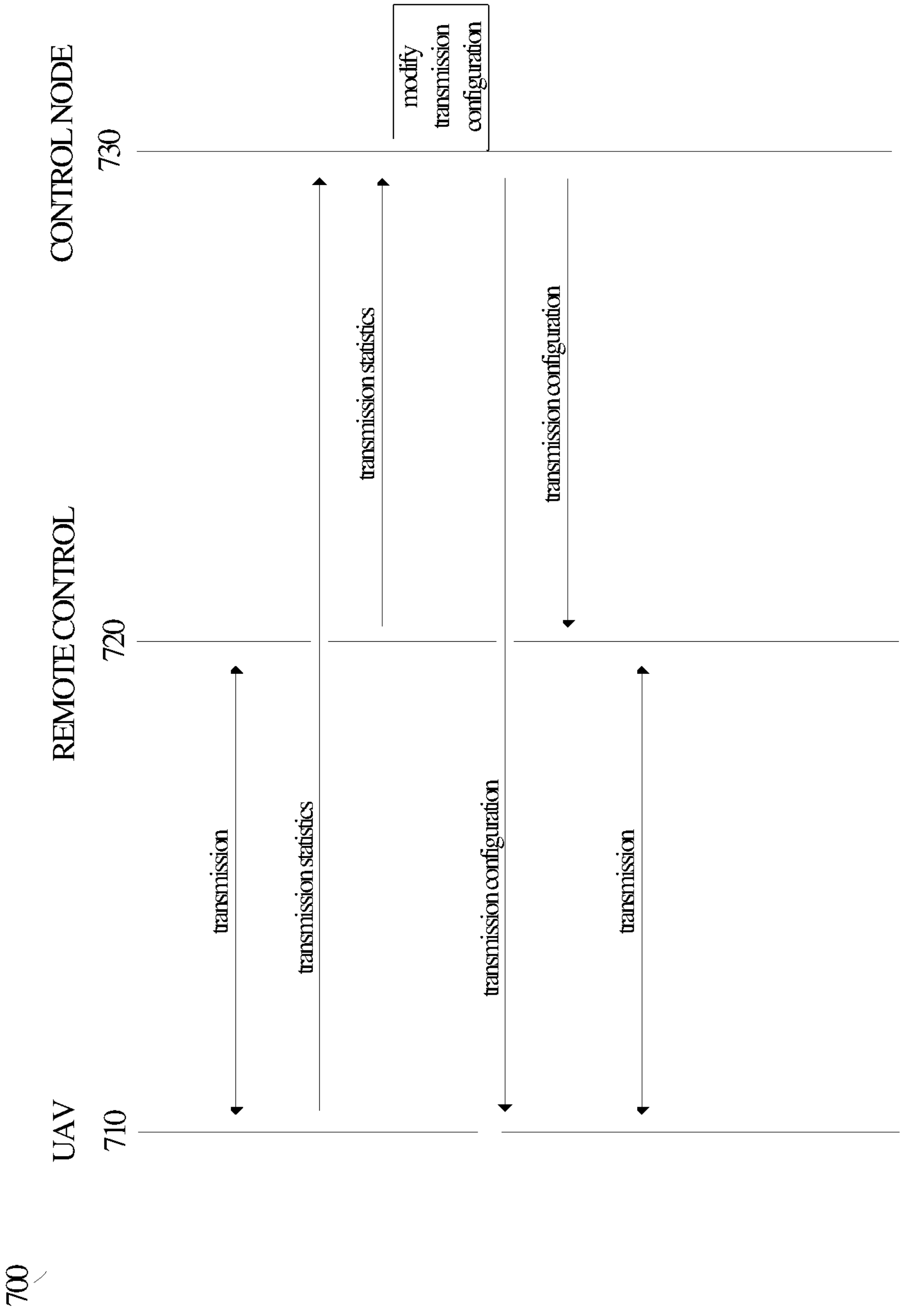
FIG. 7 illustrates an operational sequence in an implementation.

FIG. 7 represents an operational sequence 700. In the example operational sequence 700, UAV transmits data, such as live video, to remote control 720. A control node 730 manages transmission configurations. Control node 730 may be located within UAV 710 or remote control 720, or may be located elsewhere, such as on a cloud-based server.

Initially, UAV 710 sends data in a transmission to remote control 720. This data may be video data that is encoded into frames, each of which is divided into packets. The packets are received by remote control 720. In an implementation, some of the packets are not received by remote control 720. In an implementation, acknowledgements are sent by remote control 720 for some or all of the packets that are received. After the transmission, transmission statistics are sent by UAV 710 and remote control 720 to control node 730. As discussed above, control node may reside on UAV 710 or remote control 720. The transmission statistics relate to the transmission of data from UAV 710 to remote control 720. Control node 730 then processes the transmission statistics, together with any existing transmission configuration to create a modified transmission configuration. In an implementation, by coordinating the transmission statistics from both the UAV 710 and the remote control 720, the control node is able to create a transmission configuration that takes advantage of the benefits of packet retry and FEC coding, while avoiding some of the transmission waste that could occur without coordination. Control node 730 can adjust FEC coding rates, maximum retry rates, and/or bitrates, together with any other transmission configuration elements in a coordinated fashion.

After the control node has modified the transmission configuration, the modified configuration, or relevant portions thereof, are transmitted to UAV 710 and remote control 720. In an implementation, for example, it may be necessary for control node 730 to transmit all elements of the transmission configuration to UAV 710, but remote control 720 may only need access to a few elements of the transmission configuration, such as the FEC coding rate, or the bitrate. Thus, only portions of the configuration may be provided to remote control 720.

UAV 710 can then proceed to transmit more data to remote control 720 according to the modified transmission configuration.

The processes and methods discussed herein may be included in various types of computing systems, such as server computers, routers, web servers, cloud computing platforms, and data center equipment, or any other type of physical or virtual server machine, physical or virtual router, container, and any variation or combination thereof.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in many ways to form multiple embodiments. As a result, the invention is not limited to the specific embodiments described above, but only by the claims and their equivalents.

What is claimed is:

1. A method of enhancing vehicle range in an unmanned aircraft system, comprising:
- establishing a wireless communication channel between an unmanned aircraft and an end point;
- transmitting data between the unmanned aircraft and the end point over the wireless communication channel in accordance with a transmission configuration, wherein the transmission configuration defines a Forward Error Correction (FEC) value and a retry rate;
- receiving, at a control node, transmission statistics related to transmitting the data;
- modifying the transmission configuration to create a modified transmission configuration at least in part in response to the transmission statistics, wherein modifying the transmission configuration comprises:
  - adjusting the FEC value in response to a transmission success statistic of the transmission statistics, wherein the transmission success statistic is computed based on a packet success ratio; and
  - adjusting the retry rate in response to adjusting the FEC value and in response to a channel congestion statistic, wherein the channel congestion statistic is computed based on two or more of the packet success ratio, a packet reception value indicating a number of packets received, and an idle time value indicating a transmitter idle duration, and wherein adjusting the retry rate comprises reducing a maximum retry count responsive to the channel congestion statistic indicating channel congestion; and
- transmitting further data between the unmanned aircraft and the end point over the wireless communication channel in accordance with the modified transmission configuration.

2. The method of claim 1, wherein the transmission statistics comprise statistics related to the transmission of acknowledgements from the end point to the unmanned aircraft.

3. The method of claim 1, wherein the control node is located on the unmanned aircraft.

4. The method of claim 1, wherein the control node is located on the end point.

5. The method of claim 1, further comprising communicating the modified transmission configuration to the unmanned aircraft.

6. The method of claim 1, wherein the transmission configuration further comprises a bitrate setting, and wherein the method further comprises determining the bitrate setting at least in part based on the transmission statistics.

7. The method of claim 1, wherein adjusting the retry rate further comprises reducing the maximum retry count responsive to the idle time value falling below a threshold idle time.

8. A control node in an unmanned aircraft system, comprising:
- a processor and tangible memory;
- the tangible memory containing instructions, which, when executed by the processor, instruct the processor to:

establish a wireless communication channel between an unmanned aircraft and an end point;

transmit data between the unmanned aircraft and the end point over the wireless communication channel in accordance with a transmission configuration, wherein the transmission configuration defines a Forward Error Correction (FEC) value and a retry rate;

receive transmission statistics related to transmitting the data;

modify the transmission configuration to create a modified transmission configuration at least in part in response to the transmission statistics, wherein to modify the transmission, the instructions instruct the processor to:

adjust the FEC value in response to a transmission success statistic of the transmission statistics, wherein the transmission success statistic is computed based on a packet success ratio; and adjust the retry rate in response to adjusting the FEC value and in response to a channel congestion statistic, wherein the channel congestion statistic is computed based on two or more of the packet success ratio, a packet reception value indicating a number of packets received, and an idle time value indicating a transmitter idle duration, and wherein to adjust the retry rate, the instructions direct the processor to reduce a maximum retry count responsive to the channel congestion statistic indicating channel congestion; and transmit further data between the unmanned aircraft and the end point over the wireless communication channel in accordance with the modified transmission configuration.

9. The control node of claim 8, wherein the transmission statistics comprise statistics related to the transmission of acknowledgements from the end point to the unmanned aircraft.

10. The control node of claim 8, wherein the control node is located on the unmanned aircraft.

11. The control node of claim 8, wherein the control node is located on the end point.

12. The control node of claim 8, wherein the instructions further instruct the processor to communicate the modified transmission configuration to the unmanned aircraft.

13. The control node of claim 8, wherein the transmission configuration further comprises a bitrate setting, and wherein the instructions further instruct the processor to determine the bitrate setting at least in part based on the transmission statistics.

14. The control node of claim 8, wherein the instructions further direct the processor to reduce the maximum retry count responsive to the idle time value falling below a threshold idle time.

15. An unmanned aerial vehicle, comprising:

a processor and tangible memory;

the tangible memory containing instructions, which, when executed by the processor, instruct the processor to:

transmit video data;

receive transmission statistics related to the transmission of the video data from a recipient of the video data;

analyze the transmission statistics to determine an enhancement step, wherein the enhancement step comprises:

a first modification to a Forward Error Correction (FEC) setting of the transmission, wherein the first modification is computed based on a packet success ratio of the transmission statistics; and a second modification to a retry rate setting of the transmission, wherein the second modification is computed based on the packet success ratio, a packet reception value, and an idle time value of the transmission statistics, and wherein the second modification comprises reducing a maximum retry count; and transmit further video data utilizing the enhancement step.

16. The unmanned aerial vehicle of claim 15, wherein the packet success ratio comprises a probability of successful transmission of a packet based on acknowledgements of successful transmission.

17. The unmanned aerial vehicle of claim 15, wherein the enhancement step comprises an adjustment to a retry rate setting.

18. The unmanned aerial vehicle of claim 15, wherein the enhancement step comprises an adjustment to a bitrate setting.

19. The unmanned aerial vehicle of claim 15, wherein the transmission statistics comprise an idle time measurement.

20. The unmanned aerial vehicle of claim 15, wherein the transmission statistics comprise a duplicate packets measurement.

* * * * *